(12) United States Patent
Ahn

(10) Patent No.: US 8,795,873 B2
(45) Date of Patent: Aug. 5, 2014

(54) CASE FOR BATTERY PACK AND BATTERY PACK HAVING THE SAME

(75) Inventor: Byungkook Ahn, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 127 days.

(21) Appl. No.: 13/290,383

(22) Filed: Nov. 7, 2011

(65) Prior Publication Data

US 2012/0231302 A1 Sep. 13, 2012

(30) Foreign Application Priority Data

Mar. 7, 2011 (KR) .................. 10-2011-0019955

(51) Int. Cl.
*H01M 6/42* (2006.01)
*H01M 2/10* (2006.01)
*H01M 6/46* (2006.01)
*H01M 2/00* (2006.01)

(52) U.S. Cl.
USPC ............ 429/151; 429/97; 429/100; 429/153; 429/163

(58) Field of Classification Search
USPC ............................ 429/96–100, 151, 153, 163
See application file for complete search history.

(56) References Cited

U.S. PATENT DOCUMENTS

2009/0072785 A1* 3/2009 Moon ........................ 320/112
2010/0075216 A1* 3/2010 Yoo ............................ 429/151

FOREIGN PATENT DOCUMENTS

| JP | 2001-266818 | 9/2001 |
| KR | 10-2009-0029148 A | 3/2009 |
| KR | 10-2009-0029148 A | 3/2009 |
| KR | 10-2010-0033041 A | 3/2010 |

OTHER PUBLICATIONS

Korean Notice of Allowance Dated Jan. 21, 2013.

* cited by examiner

*Primary Examiner* — Muhammad Siddiquee
(74) *Attorney, Agent, or Firm* — Lee & Morse, P.C.

(57) ABSTRACT

A case for a battery pack includes a first case member including a first sidewall, a first rib extending from the first sidewall, and a coupling hook disposed on the first rib and a second case member including a second sidewall, a second rib spaced from and parallel to the second sidewall, a coupling hole defined in the second rib and coupled to the coupling hook. The first rib includes a reinforcement part disposed on an inner surface thereof facing the second rib.

18 Claims, 5 Drawing Sheets

CASE FOR BATTERY PACK AND BATTERY PACK HAVING THE SAME

BACKGROUND

1. Field

Embodiments relate to a case for a battery pack and a battery pack having the same.

2. Description of the Related Art

In general, battery packs are used in a range from portable electronic devices such as a notebook, a personal digital assistant (PDA), and a camcorder. The battery packs are manufactured by integrating several battery cells into one, which are connected in parallel and series due to the capacity limitation of one battery cell.

SUMMARY

According to an embodiment, there is provided a case for a battery pack including a first case member including a first sidewall, a first rib extending from the first sidewall, and a coupling hook disposed on the first rib, and a second case member including a second sidewall, a second rib spaced from and parallel to the second sidewall, a coupling hole defined in the second rib and coupled to the coupling hook, wherein the first rib includes a reinforcement part disposed on an inner surface thereof facing the second rib.

The second rib may extend from a center of the second sidewall and is spaced from the second sidewall.

The reinforcement part may include two sections disposed on both sides of the coupling hook.

Each reinforcement part may have a bar shape and may vertically extend adjacent a respective lateral side of the coupling hook.

The reinforcement part may be spaced from a bottom surface of the coupling hook and may have a horizontally extending bar shape.

The reinforcement part may have a bar shape and may protrude from the first rib and an inner surface of the first sidewall.

The reinforcement part may have a height less than that of the coupling hook.

The reinforcement part may have a height less than a gap between the first rib and the second rib.

The first rib may extend from an upper portion of the first sidewall, and a first lower part may extend from a lower portion of the first sidewall.

The reinforcement part may have a bottom surface spaced from the first lower part.

The reinforcement part may have a bottom surface having a length greater than that of a bottom surface of the second rib.

The reinforcement part may have a bottom surface having a length less than that of a bottom surface of the second rib.

A thickest portion of the coupling hook may have a thickness greater than that of the first rib.

The first rib may have a thickness gradually increasing from the coupling hook toward the first sidewall.

The coupling hook may include a stepped part at an upper end thereof.

The stepped part may be flush with an inner surface of the first sidewall.

The first sidewall may have a thickness greater than that of the first rib.

The first rib may include a plurality of coupling hooks and the second rib may have a plurality of coupling holes extending to the coupling hooks. The coupling hooks and the coupling holes may be coupled to each other to couple the first case member and the second case member.

According to another embodiment, there is provided a battery pack including a case including a first case member including a first sidewall, a first rib extending from the first sidewall, and a coupling hook disposed on the first rib, and a second case member including a second sidewall, a second rib spaced from and parallel to the second sidewall, a coupling hole defined in the second rib and coupled to the coupling hook. The first rib includes a reinforcement part disposed on an inner surface thereof facing the second rib. At least one bare cell is disposed between the first case member and the second case member; and a protective circuit module is disposed between the bare cell and the case.

BRIEF DESCRIPTION OF THE DRAWINGS

The above and other features will become more apparent to those of ordinary skill in the art by describing in detail exemplary embodiments with reference to the attached drawings, in which.

DETAILED DESCRIPTION

Figure 1:
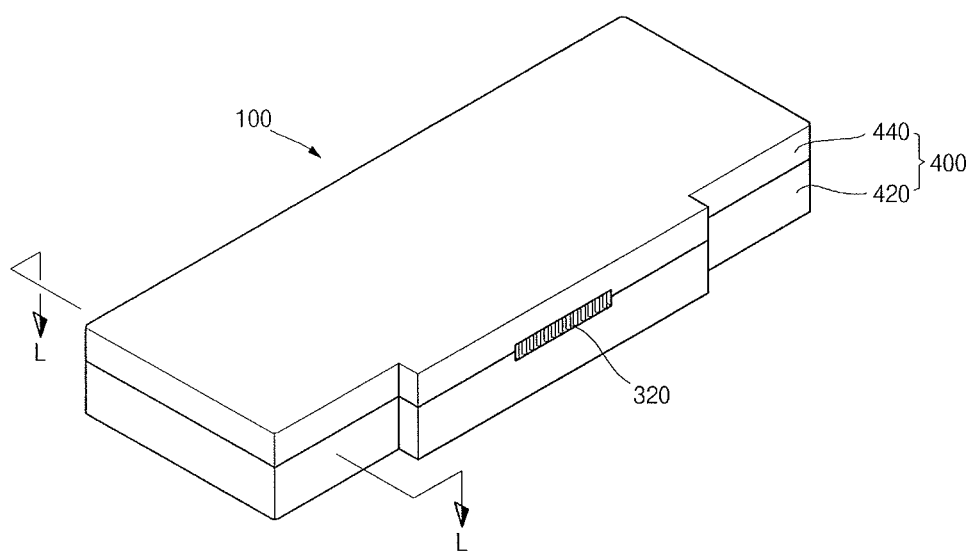
FIG. 1 illustrates a perspective view of a battery pack according to an embodiment.

Korean Patent Application No. 10-2011-0019955 filed on Mar. 7, 2011, in the Korean Intellectual Property Office, and entitled: "Case For Battery Pack and Battery Pack Having the Same" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Hereinafter, a case for battery pack and a battery pack having the same according to embodiments will be described in detail with reference to the accompanying drawings.

Figure 2:
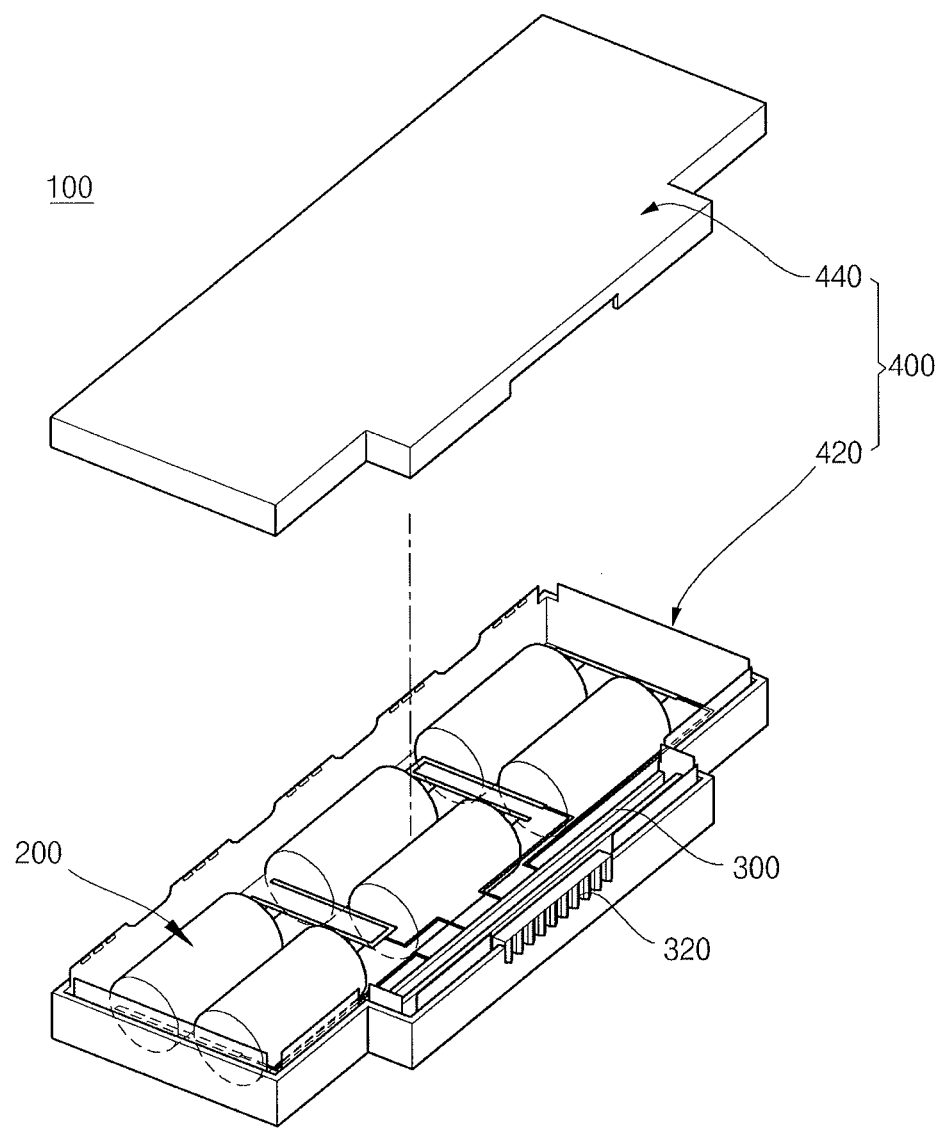
FIG. 2 illustrates an exploded perspective view of the battery pack of FIG. 2.
Figure 3:
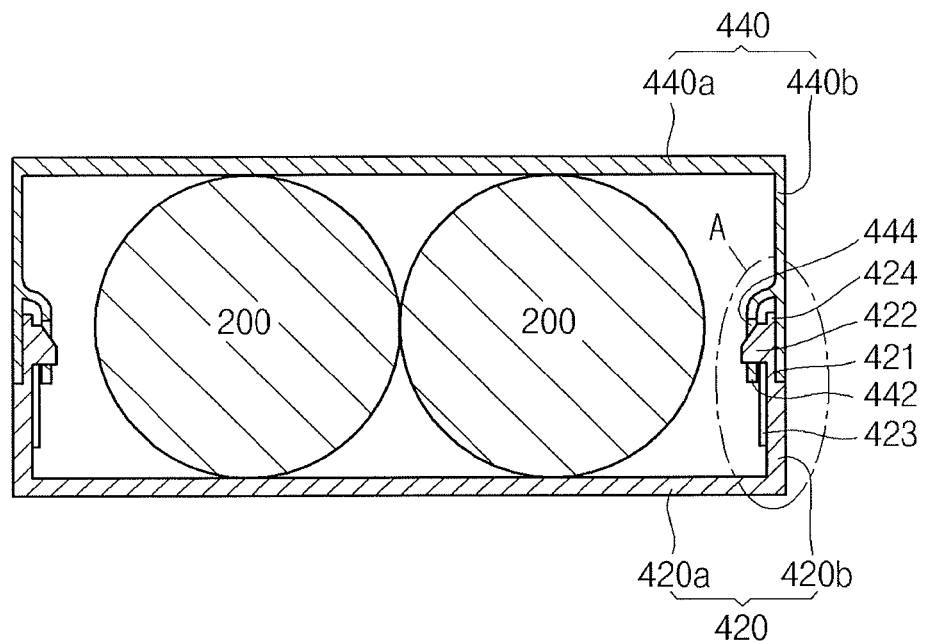
FIG. 3 illustrates a sectional view taken along line L-L of FIG. 1.
Figure 4:
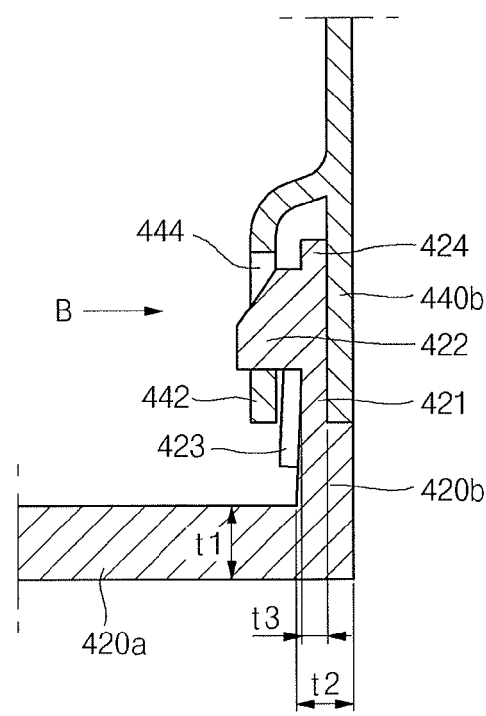
FIG. 4 illustrates an enlarged view of a portion A of FIG. 3.
Figure 5:
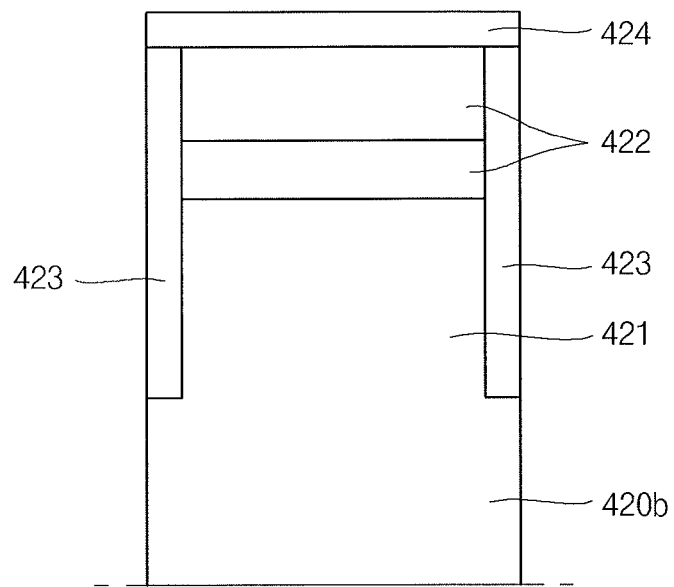
FIG. 5 illustrates a front view when viewed from a direction B of FIG. 4.

FIG. 1 illustrates a perspective view of a battery pack according to an embodiment. FIG. 2 illustrates an exploded perspective view of the battery pack of FIG. 2. FIG. 3 illustrates a sectional view taken along line L-L of FIG. 1. FIG. 4 illustrates an enlarged view of a portion A of FIG. 3. FIG. 5 illustrates a front view when viewed from a direction B of FIG. 4.

Referring to FIGS. 1 and 2, a battery pack 100 according to an embodiment includes a plurality of bare cells 200, a protective circuit module (PCM) 300, and a case 400.

A chargeable and rechargeable cylindrical secondary battery may be used as the bare cells 200. Alternatively, a cylindrical lithium ion secondary battery may be used as the bare cells 200. Although six bare cells are illustrated in FIG. 2, the present disclosure is not limited to the number of bare cells.

Each of the bare cells 200 may have top and bottom surfaces which have polarities different from each other. Thus, the top surface of the bare cell 200 may be a positive electrode, and the bottom surface of the bare cell 200 may be a negative electrode.

The PCM 300 may include a connector 320.

The PCM 300 may be disposed between the bare cell 200 and the case 400 and may be electrically connected to the bare cell 200. The PCM 300 may include protective circuit devices (not shown) for controlling the charging/discharging of the bare cell 200. The PCM 300 prevents the bare cell 200 from being overcharged or overdischarged.

The connector 320 may have a rectangular hexahedron shape. However, the present disclosure is not limited to the shape of the connector 320. The connector 320 may be disposed on one surface of the battery pack 100 facing the outside. The connector 320 may serve as an electrical path connected to external electronics.

As shown in FIG. 2, the case 400 includes a first case member 420 and a second case member 440. The case 400 receives the bare cells 200 and the PCM 300.

The first case member 420 includes a first lower part 420a, a first sidewall 420b, a first rib 421, a coupling hook 422, a reinforcement part 423, and a stepped part 424.

The first case member 420 has a box shape with an opened upper side to receive the bare cells 200. The first case member 420 includes a protrusion having a certain size at one side thereof to receive the PCM 300 and the connector 320. As shown in FIG. 2, the bare cells 200 and the PCM 300 are seated on the first case member 420.

The first lower part 420a is a surface on which the plurality of bare cells 200 is seated. The first lower part 420a may have a flat shape. The first lower part 420a may have a thickness t1 that is greater than twice a thickness t2 of the first sidewall 420b to prevent the occurrence of exterior defects and sink marks.

The first sidewall 420b extends upward from an edge of the first lower part 420a to surround the plurality of bare cells 200. The first sidewall 420b may have a thickness t2 that is greater than a thickness t3 of the first rib 421.

The first rib 421 extends upward from an inner edge of the first lower part 420b. The first rib 421 may have a thickness that is less than a thickness of the first lower part 420b.

The first sidewall 420b may include one first rib 421 or a plurality of first ribs 421. The number of the first ribs 421 may be selected according to the number of bare cells and the size of the case.

The coupling hook 422 protrudes from an inner surface of the first rib 421 toward the inside of the first case member 420. The coupling hook 422 is coupled to a coupling hole 444 in the second case member 440 to couple the first case member 420 to a second case member 440. The coupling hook 422 protrudes from a top surface of the first rib 421. For example, the coupling hook 422 may into a triangular or trapezoid shape in vertical section. Thus, the coupling hook 422 may be easily fitted into the second case member 440 and not be easily separated from the second case member 440.

The first case member 421 may include one coupling hook 422 or a plurality of coupling hooks. For example, two or three coupling hooks 422 may be provided in a group and spaced a certain distance from each other. Also, the number of the coupling hooks 422 may be selected according to the number of bare cells, the size of the case and the number of first ribs 421. Also, the coupling hook 422 may be changed in number or shape according to the size and design of the first case member 420.

The thickest portion of the coupling hook 422 may be thicker than a thickness of the first rib 421. That is, the first rib 421 may have a thickness that gradually increases from the coupling hook 422 toward the first lower portion 420a.

The reinforcement part 423 may be disposed on both sides of the coupling hook 422, for example, on respective lateral sides of the coupling hook 422. The reinforcement part 423 may have a bar shape vertically extending from or adjacent to both sides of the coupling hook 422. The reinforcement part 423 protrudes from inner surfaces of the first rib 421 and the first sidewall 420b. The reinforcement part 423 may have a height that is less than that of the coupling hook 422. The reinforcement part 423 may have a height that is less than a gap between first rib 421 and a second rib 442. Here, the term "height" of the reinforcement part 423 represents a distance that the reinforcement part 423 protrudes from the first rib 421 and the first sidewall 420b. The reinforcement part 423 may have one side surface contacting the coupling hook 422 and another surface which is flush with a side surface of the first rib 421.

The reinforcement part 423 may have a bottom surface spaced from the first lower part 420a. Also, the bottom surface of the reinforcement part 423 may have a length greater than that of a bottom surface of the second rib 442. The reinforcement part 423 may be disposed between the first rib 421 and the second rib 442 to reduce a distance between the first rib 421 and the second rib 442. Also, the reinforcement part 423 may enhance a coupling force between the first case member 420 and the second case member 440.

The stepped part 424 may be disposed on an upper end of the coupling hook 422. The stepped part 424 has an approximately "⌐" shape. The stepped part 424 may have an inner surface which is flush or coplanar with an inner surface of the first sidewall 420b. The stepped part 424 may allow the first rib 421 to be easily inserted into the second rib 442.

The second case member 440 includes a second upper part 440a, a second sidewall 440b, a second rib 442, a coupling hole 444.

The second case member 440 may have a rectangular box shape with an opened lower side to receive the plurality of bare cells 200. The second case member 440 has a size corresponding to that of the first case member 420 to cover the first case member 420.

The second sidewall 440b extends from an edge of the second upper part 440a.

The second rib 442 extends from a center of an edge of the second sidewall 440b and is spaced from the second sidewall 440b.

A distance between the second rib 442 and the second sidewall 440b may be equal to a thickness of the sum of the first rib 421 of the first case member 420 and the reinforcement part 423.

The second case member 420 may include one second rib 442 or a plurality of second ribs 440. The number of second rib 442 may correspond to the number of coupling hooks 422 and/or the number of first ribs 421. Also, the number of the second rib 442 may be changed according to the number of bare cells and the size of the case.

The coupling hole 444 is defined in a position of the second rib 442 corresponding to that of the coupling hook 422 of the first rib 421. The coupling hole 444 is coupled to the coupling hook 422. The coupling hole 444 is coupled to the coupling hook 422 of the first case member 420 to couple the first case member 420 to the second case member 440. The number of coupling hole 444 corresponds to that of coupling hook 422 of the first case member 420.

The coupling between the first case member 420 and the second case member 440 will be described in detail with reference to FIG. 4. As described above, the first case member 420 and the second case member 440 are coupled to each other through a locking structure of the coupling hook 422 and the coupling hole 444. The first rib 421 of the first case member 420 is inserted between the second rib 442 and the second sidewall 440b to couple the coupling hole 444 to the coupling hook 422. Since the plurality of coupling hooks 422 of the first rib 421 are the plurality of coupling holes 444 of the second rib 442 are coupled to each other, the first case member 420 is coupled to the second case member 440.

As described above, the battery pack 100 according to an embodiment may include the reinforcement part 423 on both sides of the coupling hook 422 to improve the coupling force between the first case member 420 and the second case member 440.

As a result, the coupling force of the coupled portion between the coupling hook 422 of the first case member 420 and the coupling hole 444 of the second case member 440 may be improved without degrading exterior quality. Thus, the first case member 420 and the second case member 440 are not easily separated from each other even though an external force is applied to the battery pack 100.

A battery pack 500 according to another embodiment will be described below.

Figure 6:
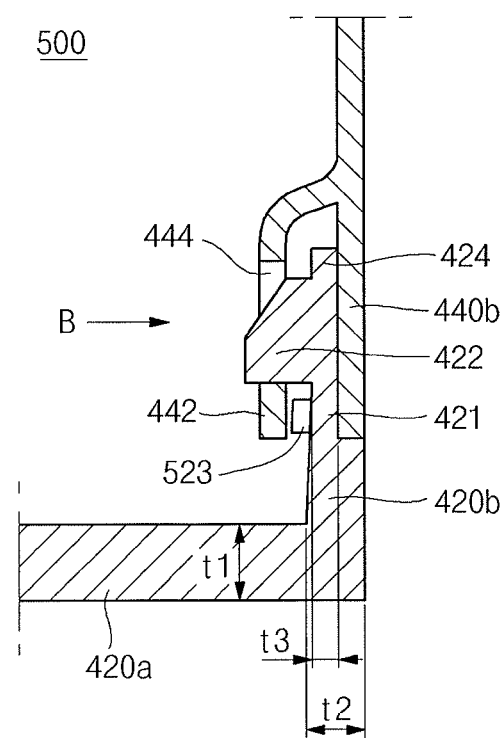
FIG. 6 illustrates a sectional view of a portion corresponding to the battery pack of FIG. 4 according to another embodiment.
Figure 7:
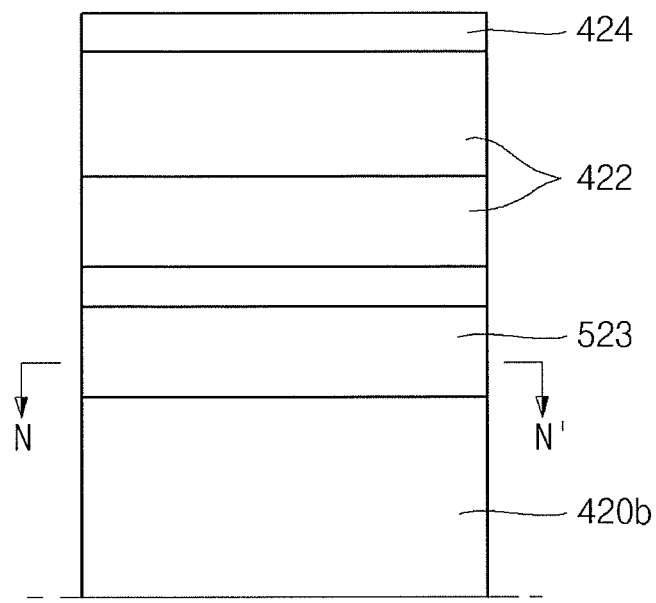
FIG. 7 illustrates a front view when viewed from a direction B of FIG. 6.
Figure 8:
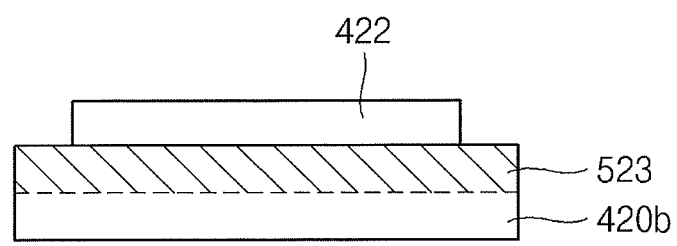
FIG. 8 illustrates a sectional view taken along line N-N' of FIG. 7.

FIG. 6 illustrates a sectional view of a portion corresponding to the battery pack of FIG. 4 according to another embodiment. FIG. 7 illustrates a front view when viewed from a direction B of FIG. 6. FIG. 8 illustrates a sectional view taken along line N-N' of FIG. 7.

The battery pack 500 according to the embodiment of FIGS. 6-8 may include a plurality of bare cells 200, a protective circuit module (PCM) 300, and a case 400. The battery pack 500 according to the embodiment of FIGS. 6-8 has the same structure as that of the foregoing embodiment of FIGS. 3 and 4 except for a structure of a reinforcement part 523. Thus, the reinforcement part 523 will be mainly described below. Also, since the plurality of bare cells 200, the PCM 300, and the case 400 of the battery pack 500 according to the embodiment of FIGS. 6-8 are equal to the plurality of bare cells 200, the PCM 300, and the case 400 of the battery pack 100 described with reference to FIGS. 3 and 4, their detailed descriptions will not be repeated herein.

The reinforcement part 523 may be spaced from a bottom surface of a coupling hook 422 and has a horizontally extending bar shape. The reinforcement part 523 may protrude from an inner surface of a first rib 421. The reinforcement part 523 may have a height that is less than that of the coupling hook 422. The reinforcement part 523 may have a height that is less than a gap between the first rib 421 and a second rib 442. Here, the height of the reinforcement part 523 represents a distance that the reinforcement part 523 protrudes from the first rib 421 and first sidewall 420b. The reinforcement part 523 may have the same width as the first sidewall 420b.

The reinforcement part 523 may have a bottom surface spaced from the first lower part 420a. Also, the bottom surface of the reinforcement part 523 may have a length that is less than that of a bottom surface of the second rib 442. The reinforcement part 523 may be disposed between the first rib 421 and the second rib 442 to reduce a distance between the first rib 421 and the second rib 442. The reinforcement part 523 may improve a coupling force between a first case member 420 and a second case member 440.

By way of summation and review, a battery pack may include a first case member including a plurality of coupling hooks, a second case member having a plurality of coupling holes defined in positions corresponding to those of the coupling hooks to couple the coupling holes to the coupling hooks, and a plurality of bare cells received in a space defined by the first and second cases. To avoid a possibility that a coupling force may be reduced when the coupling hooks of the first case member and the coupling holes of the second case member are coupled to each other, due to a distance between the respective coupling hooks and the respective coupling holes, a reinforcement member may be provided. The reinforcement part may be disposed around the coupling hook to improve the coupling force.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A case for a battery pack, comprising:
   a first case member including a first sidewall, a first rib extending from the first sidewall, and a coupling hook extending from the first rib; and
   a second case member including a second sidewall, a second rib spaced from and parallel to the second sidewall, a coupling hole defined in the second rib and coupled to the coupling hook,
   wherein the first rib includes a reinforcement part extending from an inner surface thereof facing the second rib, wherein a height of the reinforcement part from the first rib is less than a height of the coupling hook from the first rib.

2. The case as claimed in claim 1, wherein the second rib extends from a center of the second sidewall and is spaced from the second sidewall.

3. The case as claimed in claim 1, wherein the reinforcement part includes two sections disposed on both sides of the coupling hook.

4. The case as claimed in claim 3, wherein each reinforcement part has a bar shape and vertically extends adjacent a respective lateral side of the coupling hook.

5. The case as claimed in claim 1, wherein the reinforcement part is spaced from a bottom surface of the coupling hook and has a horizontally extending bar shape.

6. The case as claimed in claim 1, wherein the reinforcement part has a bar shape and protrudes from the first rib and an inner surface of the first sidewall.

7. The case as claimed in claim 1, wherein the reinforcement part has a height less than that of a gap between the first rib and the second rib.

8. The case as claimed in claim 1, wherein the first rib extends from an upper portion of the first sidewall and a first lower part extends from a lower portion of the first sidewall.

9. The case as claimed in claim 8, wherein the reinforcement part has a bottom surface spaced from the first lower part.

10. The case as claimed in claim 1, wherein the reinforcement part has a bottom surface having a length greater than that of a bottom surface of the second rib.

11. The case as claimed in claim 1, wherein the reinforcement part has a bottom surface having a length less than that of a bottom surface of the second rib.

12. The case as claimed in claim 1, wherein a thickest portion of the coupling hook has a thickness greater than that of the first rib.

13. The case as claimed in claim 1, wherein the first rib has a thickness gradually increasing from the coupling hook toward the first sidewall.

14. The case as claimed in claim 1, wherein the coupling hook includes a stepped part at an upper end thereof.

15. The case as claimed in claim 14, wherein the stepped part is flush with an inner surface of the first sidewall.

16. The case as claimed in claim 8, wherein the first sidewall has a thickness greater than that of the first rib.

17. The case as claimed in claim 1, wherein the first rib includes a plurality of coupling hooks and the second rib has a plurality of coupling holes extending to the coupling hooks, and the coupling hooks and the coupling holes are coupled to each other to couple the first case member and the second case member.

18. A battery pack comprising:

a case comprising: a first case member including a first sidewall, a first rib extending from the first sidewall, and a coupling hook extending from the first rib; and a second case member including a second sidewall, a second rib spaced from and parallel to the second sidewall, a coupling hole defined in the second rib and coupled to the coupling hook, wherein the first rib includes a reinforcement part extending from an inner surface thereof facing the second rib wherein a height of the reinforcement part from the first rib is less than a height of the coupling hook from the first rib;

at least one bare cell disposed between the first case member and the second case member; and a protective circuit module disposed between the bare cell and the case.

* * * * *